C. LIGHTBODY, Jr.

Improvement in Manufacture of Cores for Stench-Traps and other Metal Castings.

No. 132,299.  Patented Oct. 15, 1872.

UNITED STATES PATENT OFFICE.

COLIN LIGHTBODY, JR., OF BROOKLYN, NEW YORK, ASSIGNOR TO COLIN LIGHTBODY, OF SAME PLACE.

IMPROVEMENT IN THE MANUFACTURE OF CORES FOR STENCH-TRAPS AND OTHER METAL CASTINGS.

Specification forming part of Letters Patent No. 132,299, dated October 15, 1872.

*To all whom it may concern:*

Be it known that I, COLIN LIGHTBODY, Jr., of Brooklyn, in the county of Kings and State of New York, have invented a new and useful Improvement in the Manufacture of Stench-Taps and other Soft-Metal Castings; and I do hereby declare that the following is a full, clear, and exact description of the same, reference being had to the accompanying drawing forming part of this specification, and in which—

Figure 1:
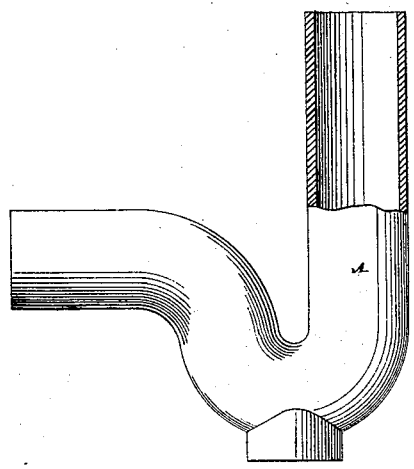
Figure 2:
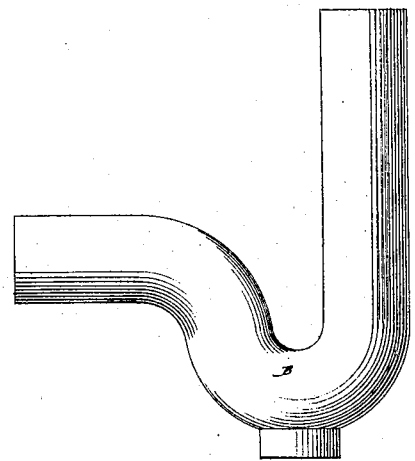

Figure 1 represents a partly-broken side view of a stench-trap such as may be made by my improvement; and Fig. 2, a side view of the core used in making said trap.

This invention is intended for soft cast-metal pipes and other articles requiring crooked cores to produce them, and is more particularly designed for making fluid or stench traps, such as used by plumbers and others, and composed of lead or any suitable soft alloy. Applied to such articles, I am enabled by my invention to produce a seamless trap by means of a sand or composition sand core. The invention consists in the peculiarity of the core, which is made up of sand combined with a small proportion of flour, mixed with molasses and water, said core afterward being baked, and subsequently coated with plumbago and clay-water, and finally, if desired, when dry, again coated with silicate of potash. A core thus made has all the firmness and consistency required to produce the casting, and admits of afterward being easily removed by first soaking and then washing out. By means of it, therefore, traps without either a longitudinal or cross seam in them may be made both cheaply and expeditiously, and much labor and liability to breakage be avoided. Said traps may be cast either with or without an opening in them for a drain-screw.

A represents a soft-metal trap; and B, the core used in casting said trap. This core is composed mainly of, say, ten parts, or thereabout, by measure, of common white beach or other suitable sand to one part (more or less) of flour. These ingredients are then mixed with molasses and water of a consistency to enable the sand and flour to conform as an entire or unbroken mass to the shape of the mold, and to retain said shape after removal from the mold, which latter should be made in two longitudinal parts or boxes to provide for removal of the core that, after being baked, is coated with a mixture of plumbago and clay-water of sufficient consistency to be worked or laid on the core by a brush. This prevents sticking of the core and gives a fine or close finish. If desired, however, it may, after being dried, be further coated with silicate of potash.

To remove such a core from the casting, it may be first soaked and then washed out by placing the casting, having the core in it, in a tank and causing water to run through the latter; or the core may be removed in any other convenient manner.

To prevent blowing when casting, the core herein described, before being jointed or having its halves as taken from the divided mold put together, should have a lamp-wick run through its center to form a vent.

What is here claimed, and desired to be secured by Letters Patent, is—

The core, composed mainly of sand mixed with flour, and held together by a binder of molasses and water, then baked, and afterward coated with plumbago and clay-water, with or without a subsequent coating of silicate of potash, substantially as specified.

COLIN LIGHTBODY, JR.

Witnesses:
FRED. HAYNES,
FERD. TUSCH.